UNITED STATES PATENT OFFICE.

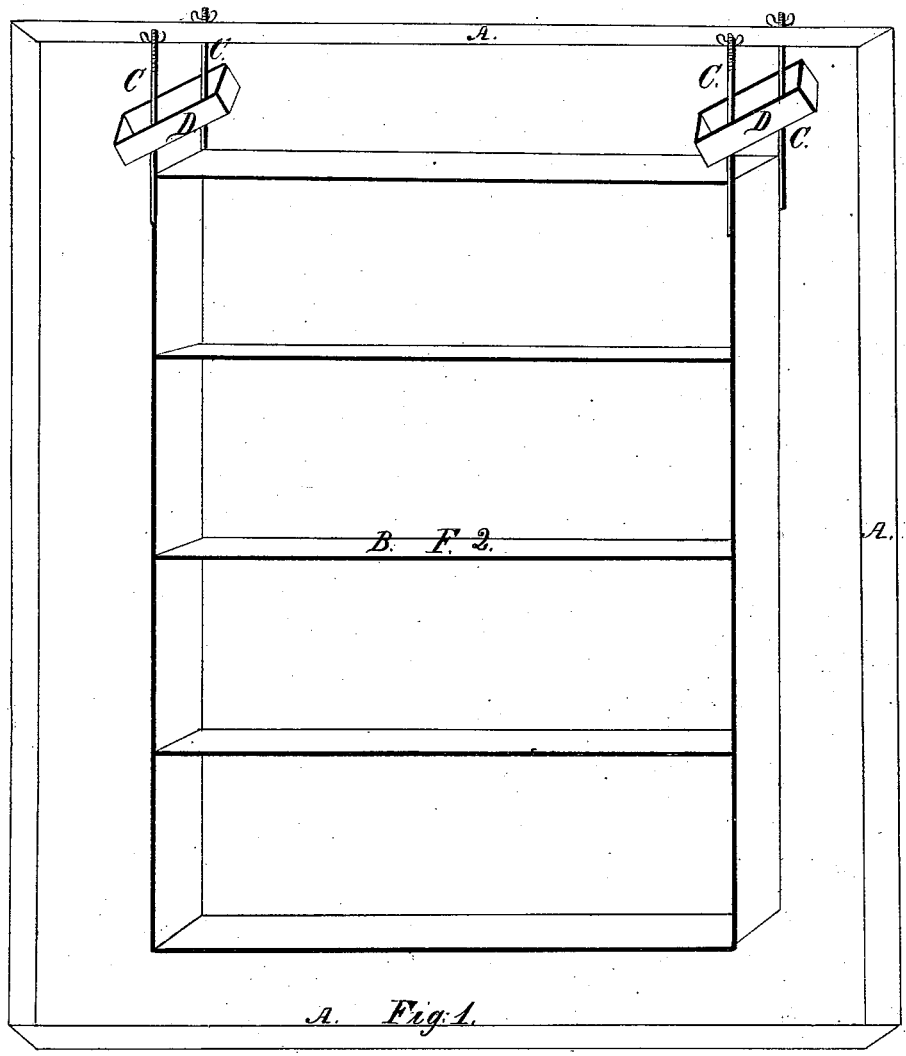

ROBERT SANDERSON, OF ATHENS, OHIO.

PROTECTING SAFES, &c., FROM INSECTS.

Specification of Letters Patent No. 2,902, dated January 10, 1843.

*To all whom it may concern:*

Be it known that I, ROBERT SANDERSON, of Athens, Athens county, and State of Ohio, have invented a new and improved mode of protecting cupboards from the depredations of ants and other insects, and also granaries, wardrobes, and shelves in storerooms from the depredations of rats, mice, and other animals; and I do hereby declare the following to be a full and exact description of the construction and operation of the same, reference being had to the annexed drawing, making a part of this specification, in which—

A, A, A, Figure 1, is a perspective view of a frame in which is suspended a cupboard wardrobe or any furniture to be secured from vermin.

B, Fig. 2 is a common cupboard or wardrobe suspended from the top of the frame A.

C, C, C, C, are suspending rods with screw and nuts on the top.

D, D, are troughs to contain water soldered to the suspending rods.

In order to construct a cupboard or other furniture to be secure, procure a frame made with four uprights and cross pieces, as per A, A, A, Fig. 1, or made with boards as may be necessary or convenient, sufficiently large to contain your suspended cupboard leaving a vacancy all around, and, also the top and bottom of several inches as the case may be. Your cupboard or wardrobe may be made in the usual form with shelves as seen in B, Fig. 2 or in any other form you may think proper, with a rod of iron fastened at each corner as per C, C, C, C, passing through the top of the frame with a screw nut on the top for suspending the cupboard. This cupboard hanging by the rods prevents access in any direction except down the rods C, C, C, C; to prevent the ants from passing down the rods, make a trough or basin of tin, copper, or lead, let the rods pass through the bottom of the trough D, D, and solder them fast to the rods about equidistant from the frame and cupboard, this done and the whole is completed. To prevent ants or other vermin from descending the rods pour water or any liquid in the basin or trough and their passage will be effectually prevented.

To prevent the water from freezing in severe weather put as much salt in the water as will dissolve.

Shelves for store rooms closed behind and thrown a few inches from the wall; or granaries suspended by rods from the joists, will be secured from the depredations of mice, rats or other animals.

What I claim in the above specification as new and my own invention, is—

Suspending cupboards, wardrobes, granaries and shelves for stores by rods with the trough or basin to contain water for preventing the approach of animals or insects of any description.

ROBERT SANDERSON.

Witnesses:
  G. A. BEATON,
  A. VAN VOORHIS.